(12) United States Patent
Elgamal (10) Patent No.: US 11,003,834 B2
(45) Date of Patent: May 11, 2021

(54) MARKUP LANGUAGE PARSER (71) Applicant: International Business Machines Corporation, Armonk, NY (US)

(72) Inventor: Ali A. S. A. Elgamal, 6th of October (EG)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/841,474

(22) Filed: Dec. 14, 2017

(65) Prior Publication Data
US 2018/0107634 A1   Apr. 19, 2018

Related U.S. Application Data (63) Continuation of application No. 14/174,295, filed on Feb. 6, 2014, now Pat. No. 9,934,205.

(30) Foreign Application Priority Data

Feb. 18, 2013 (GB) ...................... 1302775

(51) Int. Cl.
*G06F 16/23* (2019.01)
*G06F 16/24* (2019.01)
(Continued)

(52) U.S. Cl.
CPC .............. *G06F 40/14* (2020.01); *G06F 16/23* (2019.01); *G06F 16/24* (2019.01); *G06F 40/221* (2020.01)

(58) Field of Classification Search
None
See application file for complete search history.

(56) References Cited

U.S. PATENT DOCUMENTS

2005/0010581 A1   1/2005 Doan
2005/0055336 A1   3/2005 Hui et al.
(Continued)

FOREIGN PATENT DOCUMENTS

EP        2148276 A1     1/2010

OTHER PUBLICATIONS

Lewis, Secure Coding Best Practices for Memory Allocation in C and C++ May 17, 2006, Code project, https://www.codeproject.com/Articles/13853/Secure-Coding-Best-Practices-for-Memory-Allocation?display=Print.*

(Continued)

*Primary Examiner* — Jason G Liao
(74) *Attorney, Agent, or Firm* — Law Office of Jim Boice (57) ABSTRACT A computer-implemented method returns a third child data element from a structured tree. One or more processors traverse through a structured tree using a single direction iteration order until a first child data element and second child data element are reached. In response to reaching the second child data element, the processor(s) remove from memory any description of the structured tree that was used to reach the first child data element and the second child data element other than an element level counter that describes the level of the structured tree at which the first sibling data element and the second sibling data element are located. The processor(s) utilize a content of the element level counter to reconstruct the structured tree in order locate and return a third child data element in the reconstructed structured tree to a requester.

20 Claims, 8 Drawing Sheets (51) Int. Cl.
*G06F 40/14* (2020.01)
*G06F 40/221* (2020.01)

(56) References Cited

U.S. PATENT DOCUMENTS

| | | |
|---|---|---|
| 2007/0198919 A1 | 8/2007 | Clarke et al. |
| 2011/0179085 A1 | 7/2011 | Hammerschmidt et al. |
| 2012/0124102 A1 | 5/2012 | Clarke et al. |
| 2012/0143919 A1 | 6/2012 | Idicula et al. |
| 2012/0143927 A1 | 6/2012 | Hill et al. |

OTHER PUBLICATIONS

GB Intellectual Property Office—Search Report for GB Application No. 1302775.0, dated Aug. 23, 2013.
Busatto et al., "Efficient Memory Representation of XML Document Trees", Elsevier Science, Journal of Information Systems, vol. 33, Issues 4-5, Jun. 2008, pp. 456-474.
E. Dede et al., "Scalable and Distributed Processing of Scientific XML Data", IEEE/ACM, Proceedings of the 12th International Conference on Grid Computing, 2011, pp. 121-128.
S. Kim et al., "Dom Tree Browsing of a Very Large XML Document: Design and Implementation", Elsevier Science, The Journal of Systems and Software, vol. 82, 2009, pp. 1843-1858.
Knuth, "The Art of Computer Programming", Addison-Wesley, 1973, vol. 1, pp. 307-309.
Bray et al., "Extensible Markup Language (XML) 1.0", W3C, Nov. 27, 2008, Fifth Ed.
Bray et al., "Extensible Markup Language (XML)", W3C, Working Draft, Nov. 14, 1996.
USPTO, "General Requirments Bulletin for Admission to the Examination for Registration to Practice in Patent Cases Before the United States Patent and Trademark Office". Jul 15.
Kimber, "The SGML Storage Model", drmacro.com, Aug. 30, 1998.
Abet, "Criteria for Accrediting Computing Programs: Effective for Reviews During the 2013-2014 Accreditation Cycle". Oct. 27, 2012, pp. 1-9.
"Parse", Date Unknown [Captured on Aug. 25, 2016], dictionary.com.
Level Order Tree Traversal Nov. 7, 2009 [Captured by archive.org on Jul. 4, 2010], GEEKSFORGEEKS.
Relex et al., "How to Make the Result of a BFS Spanning Tree Is Shown in Preorder", Jan. 18, 2012.
Boone, "An XSLT Breadth-First Search for Processing XML Schema". (TL;DR) Jul. 2012, Healthcare Standards.
List of IBM Patents or Patent Applications Treated as Related. Dec. 14, 2017.
U.S. Appl. No. 14/174,295 Non-Final Office Action dated Mar. 2, 2016.
U.S. Appl. No. 14/174,295 Final Office Action dated Aug. 31, 2016.
U.S. Appl. No. 14/174,295 Non-Final Office Action dated Apr. 7, 2017.

\* cited by examiner

300 Initiate Parsing Method

302 Set pointer to point at root element

304 Set counter to level zero

306 Return root element

FIG. 3a

350 Next Element Method

352 Parse document from pointer to the next element

354 Update counter if boundary is crossed.

356 Update element pointer

358 Return element and element level

*<company name="company1"> <department name="dep1"> <employee>Emp1</employee> <employee>Emp2</employee> </department> <department name="dep2"> <employee>Emp3</employee> </department name="dep3"> <employee>Emp4</employee> <employee>Emp5</employee> <department> </company>*

FIG. 5a

1. *<companyname="company1">*
2. *<departmentname="dep1">*
3. *<employee>Emp1</employee>*
4. *<employee>Emp2</employee>*
5. *</department>*
6. *<departmentname="dep2">*
7. *<employee>Emp3</employee>*
8. *</departmentname="dep3">*
9. *<employee>Emp4</employee>*
10. *<employee>Emp5</employee>*
11. *<department>*
12. *</company>*

MARKUP LANGUAGE PARSER

This application is based on and claims the benefit of priority from United Kingdom (GB) Patent Application 1302775.0, filed on Feb. 18, 2013, and herein incorporated by reference in its entirety.

BACKGROUND

This invention relates to a method and apparatus for a markup language parser. In particular this relates to a single direction parser and method for parsing an extended markup language (XML) document.

Information technology deals with increasing amounts of data and more efficient methods for processing large amounts of data are always in demand.

Data can be represented in structural (also known as hierarchical) form using tags in XML documents. There are at least two processing methods for processing structured data in such documents.

Tree based processing is a first processing method whereby structured data is extracted and populated as a tree structure in memory. This tree is a closed representation of structured data as it maintains the structure and hierarchy and all relevant information that can be extracted from XML. A document object model (DOM) is a standard for this way of processing. A common representation of a tree structure represents the elements as records with pointers to children, parents, or both, or as items in an array, with relationships between them determined by their positions in the array. In general an element in a tree will not have pointers to its parents, but this information can be included (expanding the data structure to also include a pointer to the parent) or stored separately. Alternatively, upward links can be included in the child element data, as in a threaded binary tree.

Event based processing is a second processing method whereby XML data is represented by a series of events. Each event represents a small portion of the data. Processing is done either in a push mode, like in Simple Application Programming Interface (API) for XML or SAX, where the parser reads the XML data and calls the client with the events or in a pull mode, like in Streaming API for XML (StAX), where the client calls the parser to get the next event from the XML data.

Both processing methods have limitations and issues. Event based processing with its low memory consumption does not maintain the hierarchical structure of the data and thus the client application needs to relate events to each other in order to understand this hierarchy. The default tree based processing, consumes a lot of memory because all information in the XML data is populated as a tree in memory. When an XML data set is large and the available memory is low, tree based processing cannot be used. Several publications have attempted to address the limitation of tree based processing.

One publication describes a scalable DOM implementation that reduces the memory consumption by making some references between the tree elements weak while the client application will have strong references to the elements it needs. If an element is only referenced by weak references, the garbage collector can release this element from memory when the application is running low in memory.

One publication describes memory efficient data processing for analyzing the operations that need to be performed on a data structure and for deciding which data should be loaded in memory.

One publication describes a method for loading large XML documents on demand. In this publication, portions of the document are loaded in the memory and other portions are stored in a database in a way that is transparent to the client application.

SUMMARY

In one or more embodiments of the present invention, a computer-implemented method returns a third child data element from a structured tree. One or more processors traverse through a structured tree using a single direction iteration order until a first child data element is reached. The processor(s) increment an element level counter to describe a level of the structured tree at which a first sibling data element is located. The processor(s) determine that the first child data element is a leaf node having no further child nodes in the structured tree and, in response to determining that the first child data element is a leaf node in the structured tree, redefine the first child data element as a sibling to the first sibling data element. In response to the first child data element being redefined as the sibling to the first sibling data element, the processor(s) traverse from the first child data element through a second sibling data element in order to reach a second child data element. In response to reaching the second child data element, the processor(s) remove from memory any description of the structured tree that was used to reach the first child data element and the second child data element other than the element level counter that describes the level of the structured tree at which the first sibling data element and the second sibling data element are located, such that the structured tree is used once and discarded after locating and returning the first child data element and the second child data element. Subsequent to removing from memory said any references to the structured tree that was used to reach the first child data element and the second child data element other than the element level counter, the processor(s) receive a request from a requester for a third child data element from the structured tree, where the third child data element is a child of the second sibling data element. The processor(s) utilize a content of the element level counter to reconstruct the structured tree in order locate the second sibling data element and to traverse from the second sibling data element to the third child data element, in order to locate and return the third child data element in the reconstructed structured tree to the requester.

In one or more embodiments of the present invention, the present invention is implemented as a computer program product and/or in a system.

BRIEF DESCRIPTION OF THE DRAWINGS

Preferred embodiments of the present invention will now be described, by way of example only, with reference to the following drawings in which.

DETAILED DESCRIPTION

Figure 1:
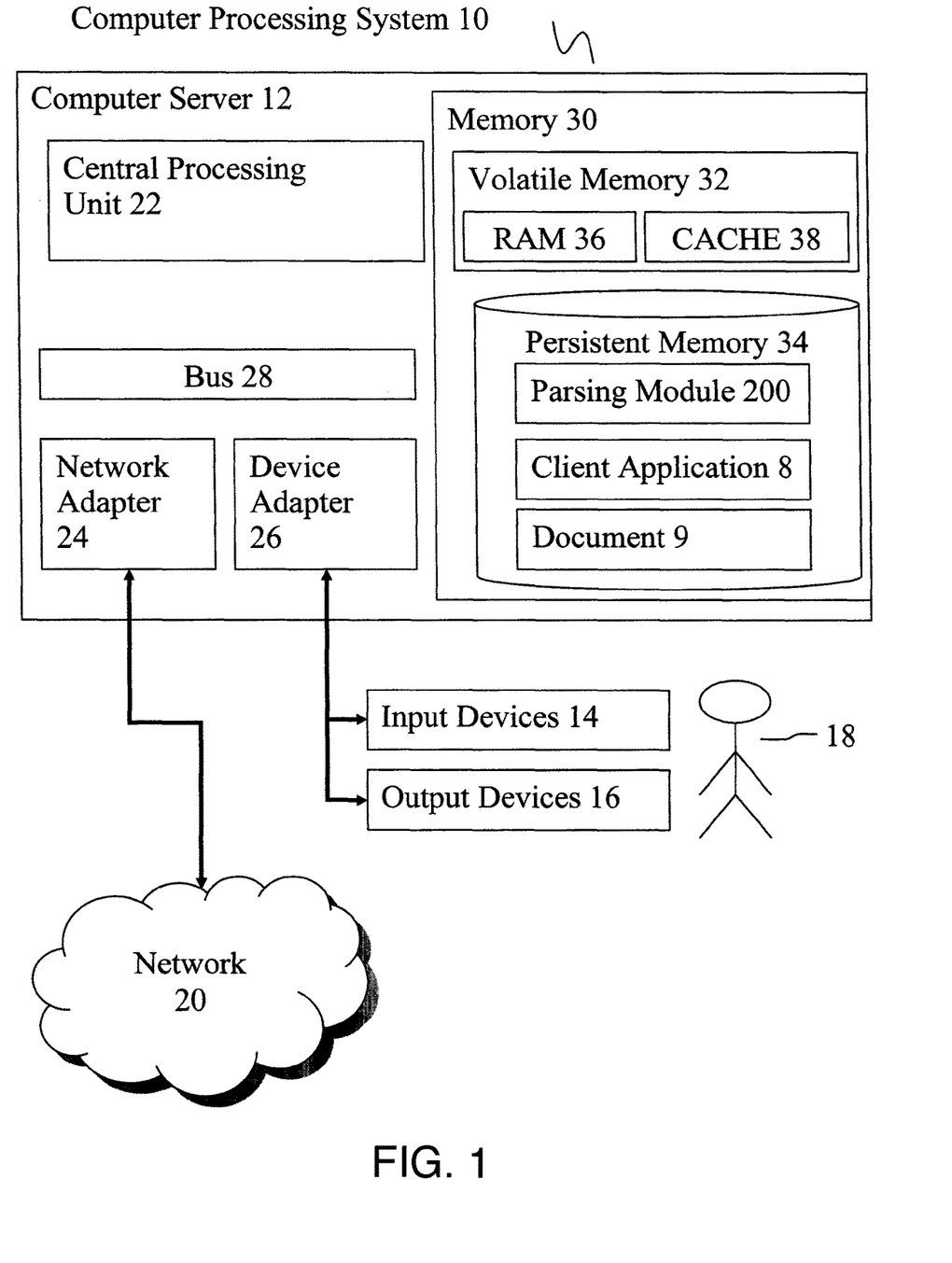
FIG. 1 is a deployment diagram of a parsing module of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises a parsing module 200, a client application 8 and an XML document 9. Further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2A:
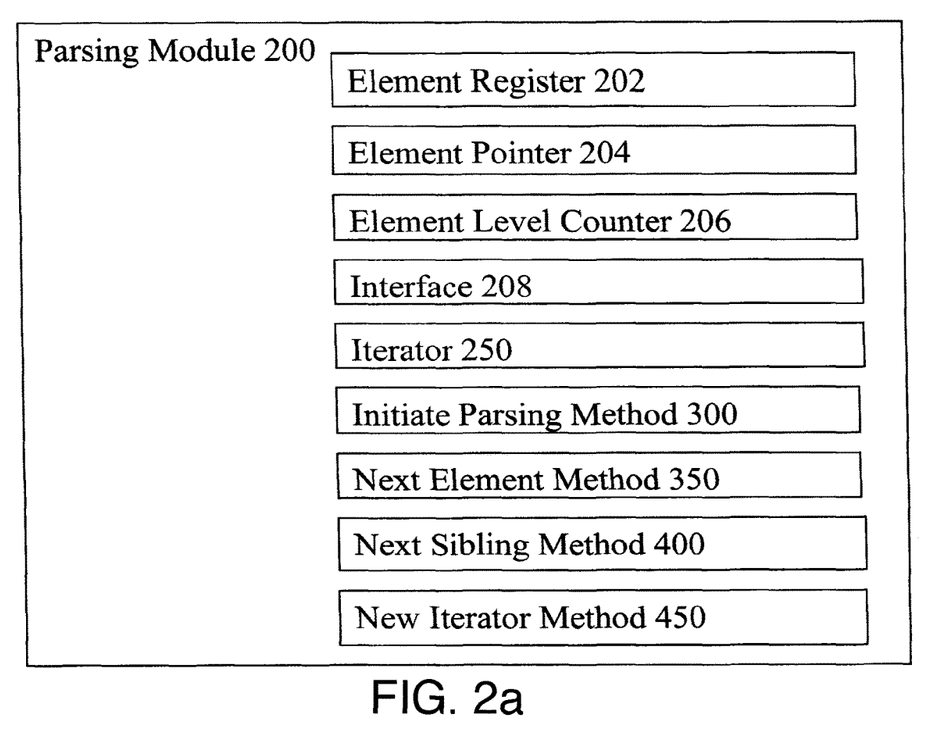
FIG. 2a and FIG. 2b are component diagrams of the parsing module of the preferred embodiment.

Referring to FIG. 2a, parsing module 200 of the present embodiment comprises: element register 202; element pointer 204; element level counter 206; interface 208; iterator 250; initiate parsing method 300; next element method 350; next sibling method 400; and new iterator method 450. Parsing module 200 when loaded and executed by computer processing system 10 performs as a parsing engine for parsing a plurality of elements arranged in a structured tree within a document, wherein said elements are arranged with a root element at a root level branching to further elements at higher levels within the structured tree.

Element register 202 is for storing a reference or a copy of the value of a selected element in a referenced document before it is returned to a requesting entity.

Element pointer 204 is for storing a reference to an element and wherein initially the reference is to the root element.

Element level counter 206 is for registering a level within the structured elements for the referenced element and wherein the registered level is initially the root level.

Interface 208 is for allowing an external entity to call one of the parsers and for returning returned results to the external entity.

Figure 2B:
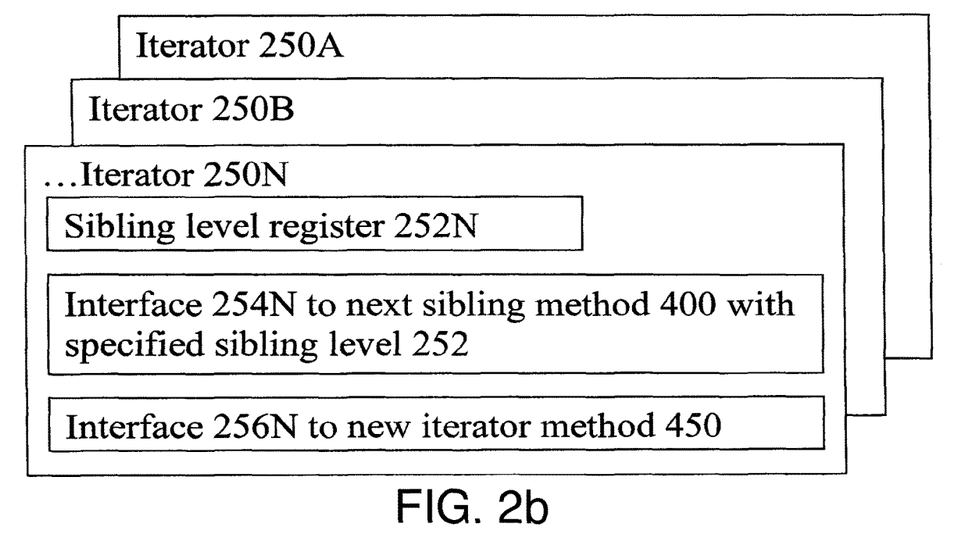

Iterator 250 is a class that is instantiated as an object by new iterator method 450 and sent to an application in response to a request for a new iterator (when a next child is required) and is described in more detail with respect to FIG. 2b.

Figure 3A:
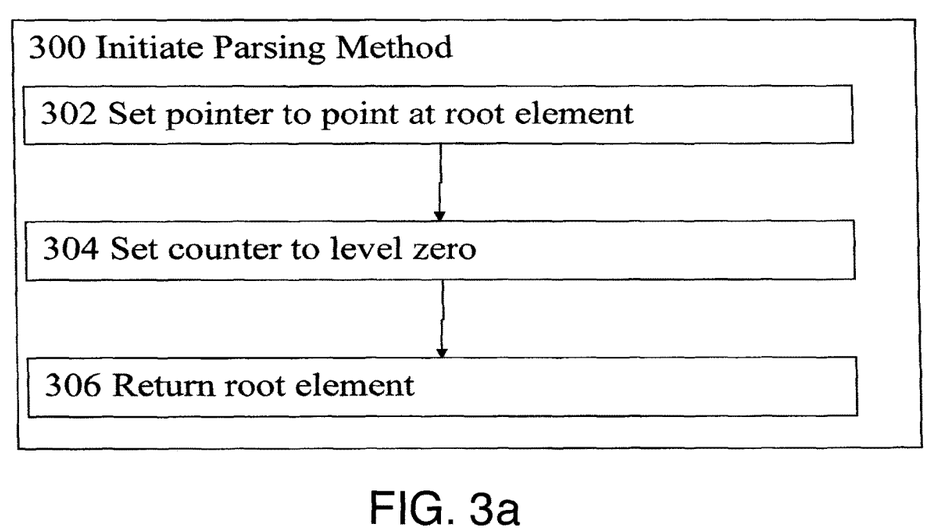
FIG. 3a and FIG. 3b are schematic diagrams of methods of the preferred embodiment.

Initiate parsing method 300 is for controlling parsing module and is described in more detail with respect to FIG. 3a.

Figure 3B:
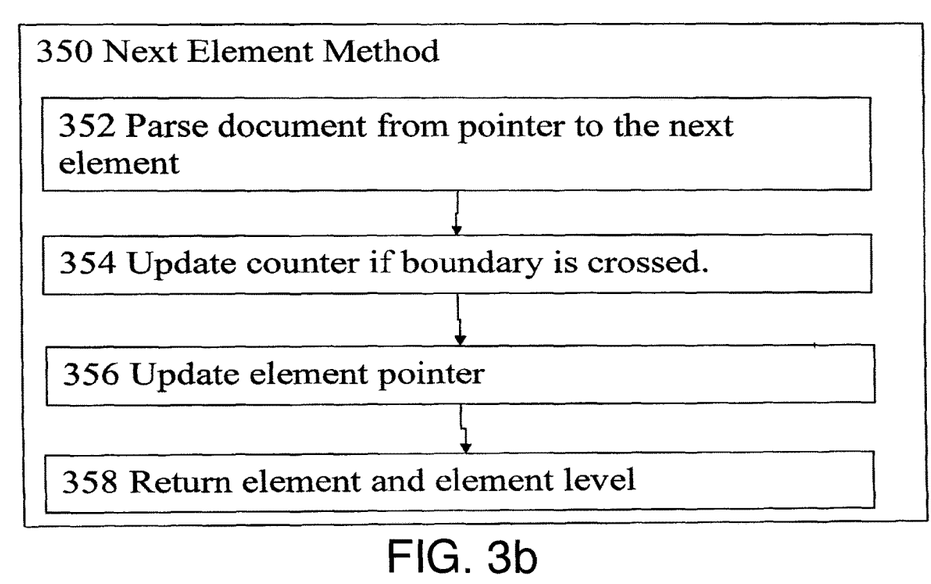

Next element method 350 is for fetching the next element in the structure tree and is described in more detail with respect to FIG. 3b.

Next sibling method 400 is for providing a next sibling element by fetching the next and subsequent elements in the document until the next element is a next element at a specified sibling level in the structured tree and returning the next sibling element. Next sibling method 400 is described in more detail with respect to FIG. 4a.

New iterator method 450 is for reading the next element and corresponding next level in the document and if the next level is a lower level then returning the next element and corresponding next level else returning a null value. New iterator method 450 is described in more detail with respect to FIG. 4b.

Referring to FIG. 2b, iterators 250A, 250B to 250N are N objects instantiated from iterator 250 where N can be any number. Generic iterator object 250N comprises: sibling level register 252N; interface 254N to next sibling method 400; and interface 256N to new iterator method 450.

Sibling level register 252N is for storing the sibling level for which iterator object 250N was created.

Interface 252N is for receiving an external request to provide a next sibling element in the structured tree and call next sibling element 400 with the value of sibling register 252N and returning the result to the external requester.

Interface 254N is for receiving an external request to provide a new iterator and calls new iterator method 450 and returns the result to the external requestor.

Referring to FIG. 3a, initiate parsing method 300 of the preferred embodiment comprises logical process steps 302 to 306.

Step 302 is for setting element pointer 204 to point at the root element. Next step 304.

Step 304 is for setting element level counter 206 to the root level (for example zero). Next step 306.

Step 306 is for returning the root element. This is the end of method 300.

Referring to FIG. 3b, next element method 350 of the preferred embodiment comprises logical process steps 352 to 358.

Step 352 is for parsing the document from the element at the element pointer to the next element when called by next sibling method 400. Next step 354.

Step 354 is for incrementing or decrementing the element level counter if a boundary is crossed during step 352. Next step 356.

Step 356 is for updating the element pointer. Next step 358.

Step 358 is for returning the element and the element level to the calling method. Step 358 is the end of next element method 350.

Figure 4A:
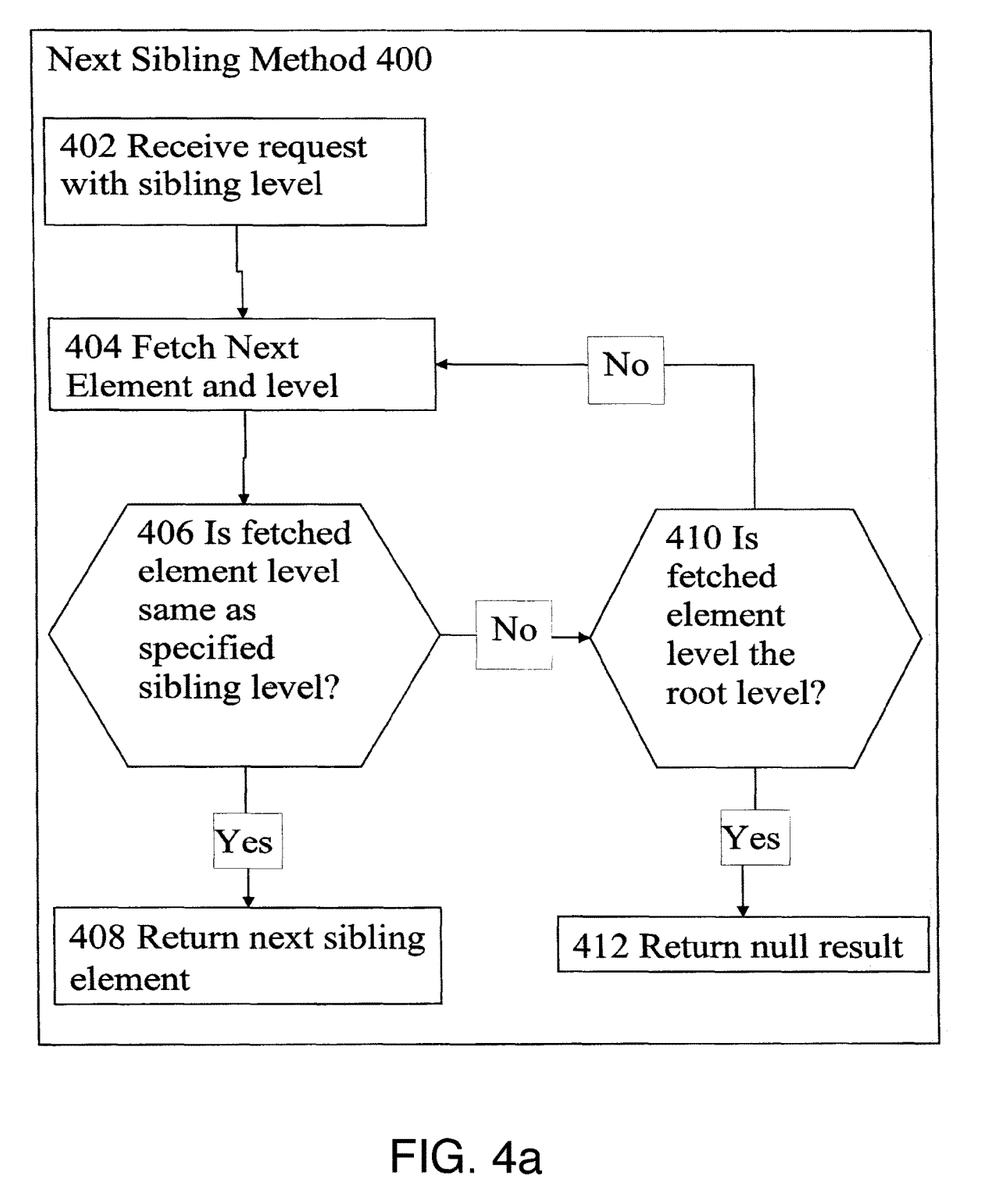
FIG. 4a and FIG. 4b are schematic diagrams of further methods of the preferred embodiment.

Referring to FIG. 4a, next sibling method 400 comprises logical process steps 402 to 412.

Step 402 is for receiving a request with a specified sibling level. Next step 404.

Step 404 is for getting the next element and level from next element method 350.

Step 406 is for checking if the fetched element level is the same or higher than the specified sibling level and if so then step 408 else step 410.

Step 408 is for returning the next sibling element.

Step 410 is for checking if the fetched element level is the root level and moving to step 412 if so else back to step 404.

Step 412 is for returning a null result to indicate that there are no more sibling elements the requested sibling level.

Figure 4B:
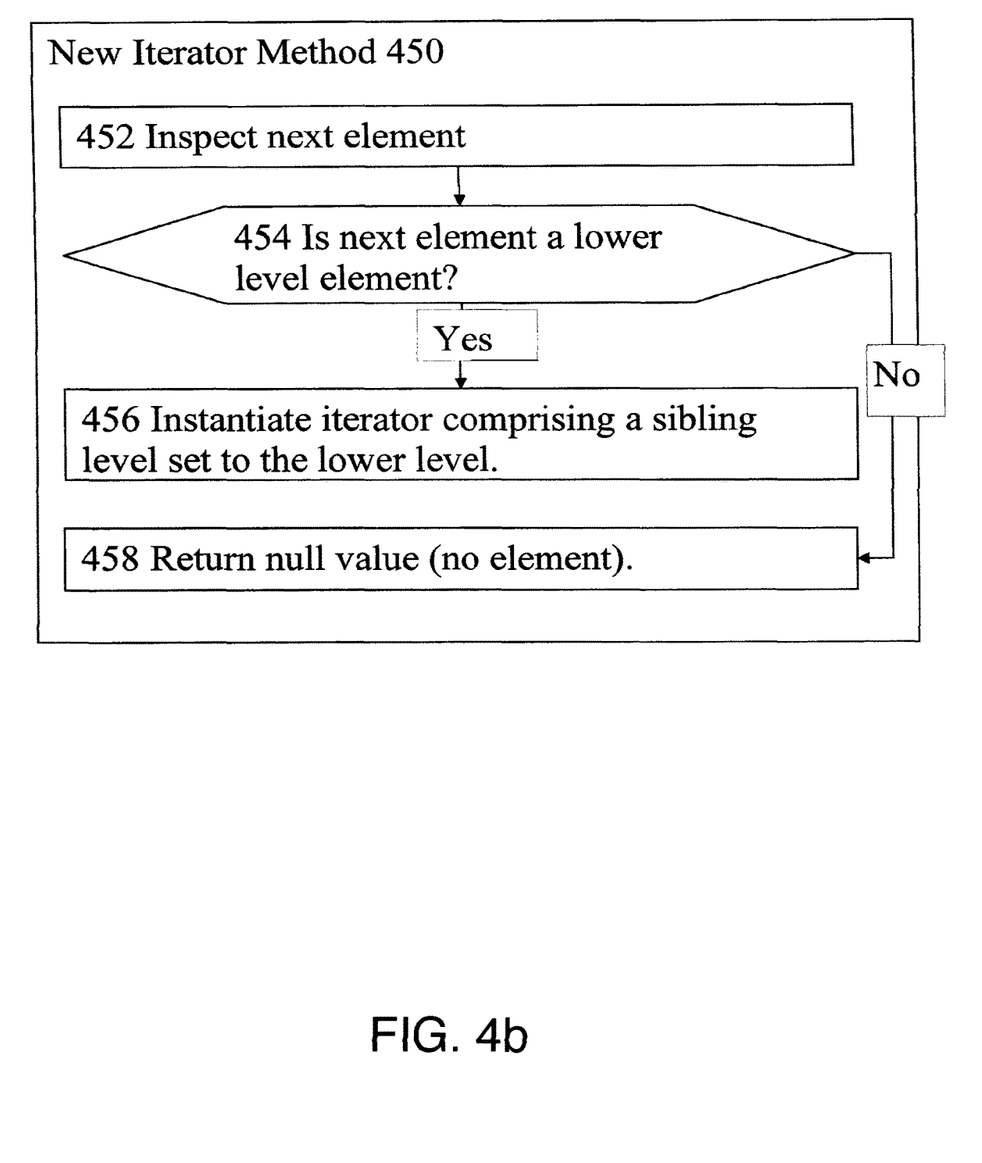

Referring to FIG. 4b, new iterator method 450 comprises logical process steps 452 to 458.

Step 452 is for inspecting the next element in the tree structure. Next step 454.

Step 454 is for checking if the next element is a lower level element indicative of a child element and moving to step 456 if so. If not then step 458.

Step 456 is for instantiating an iterator object with a specified sibling level set to the lower level. End of method.

Step 458 is for returning a null value to show that there is no child element. End of method 450. Thus, reiterating steps described in FIG. 3a to FIG. 4b, FIG. 7 depicts a high-level flowchart of one or more steps performed by one or more processors to parse a plurality of data elements arranged in a structured tree within a document. After initiator block 701, one or more processors receive an external request to provide one or more elements from a structured tree, where the one or more elements being requested are from a group consisting of a next sibling element and a next child element in the structured tree, as described in block 703. As described in block 705, one or more processors provide a next sibling element by fetching next and subsequent elements in the document until a specified sibling level in the structured tree is reached. As described in block 707, one or more processors return the next sibling element to a requester. As described in block 709, one or more processors provide a next child element by fetching and returning a next element in response to the next element being a child element. As described in block 711, one or more processors return the next child element to the requester. As described in block 713, a pointer initially points at a root element in a root level of the structured tree. As described in block 715, the pointer points at another element in the structured tree.

Figure 7:
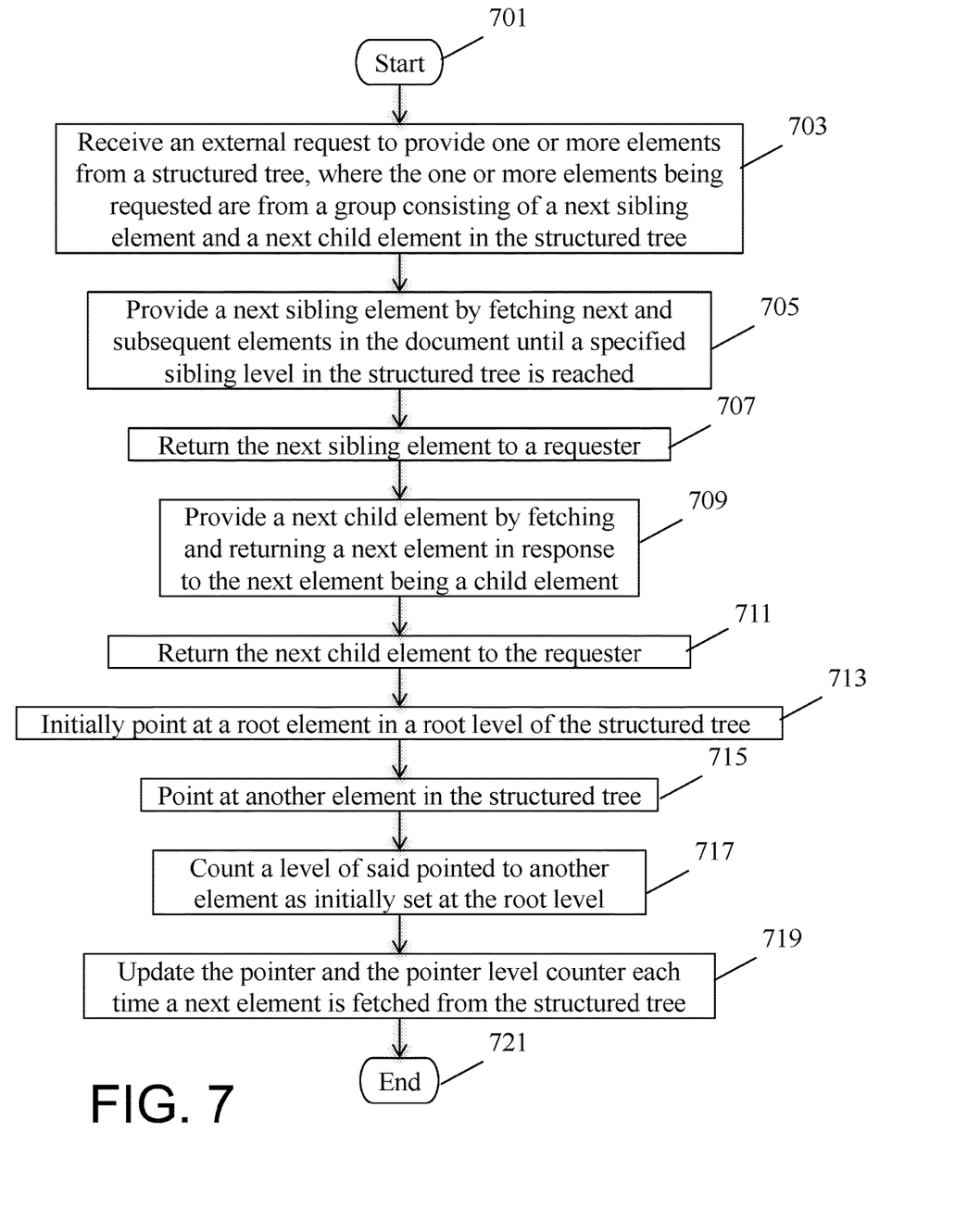

As described in block 717, a pointer level counter counts a level of said pointed to another element as initially set at the root level. As described in block 719, one or more processors update updating the pointer and the pointer level counter each time a next element is fetched from the structured tree. The flowchart ends at terminator block 721.

Figure 5A:
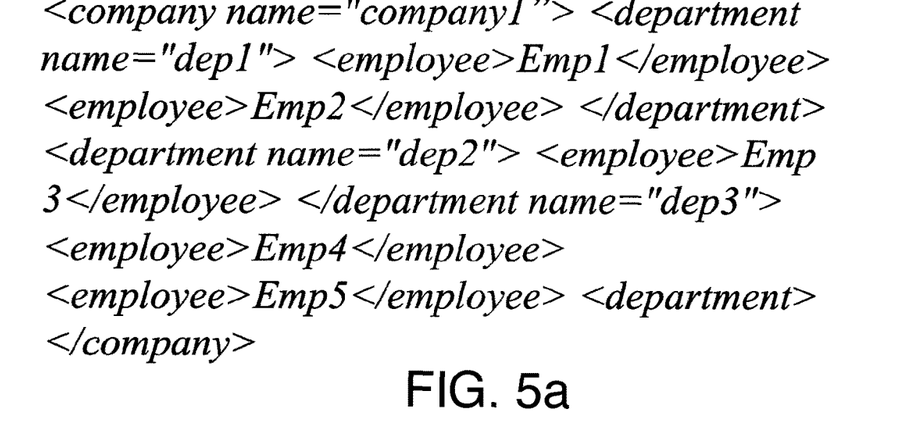
FIG. 5a and FIG. 5b are representations of an example XML, code used to illustrate the preferred embodiment.
Figure 5B:
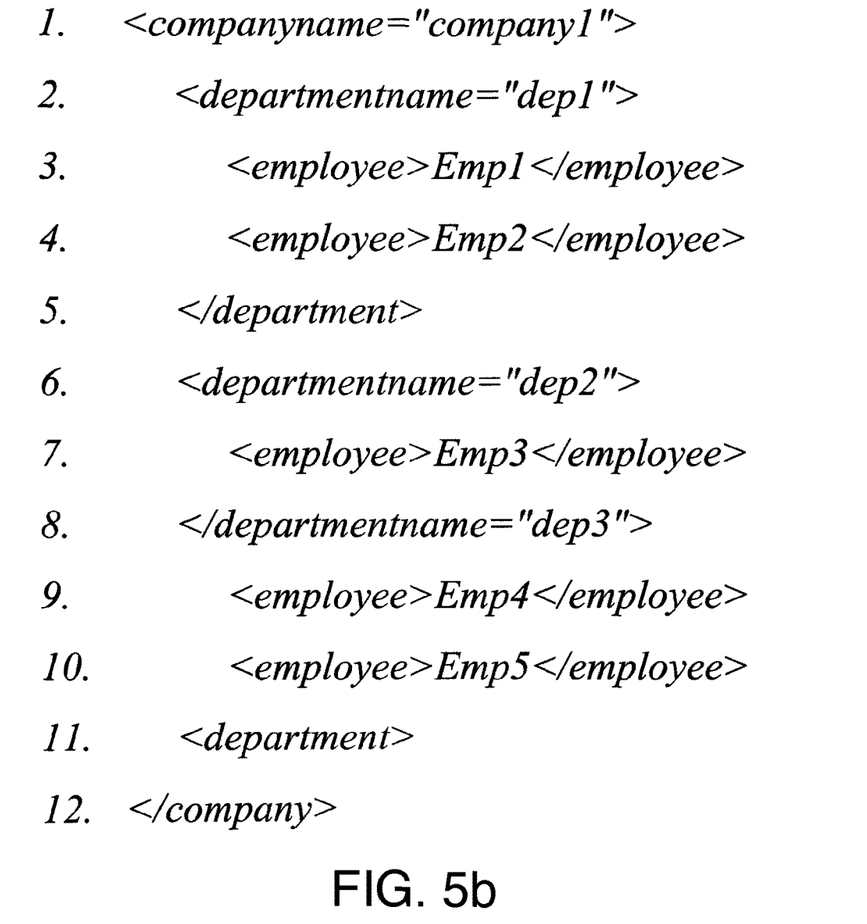

Referring to FIG. 5a and FIG. 5b, example XML code is shown in two different ways. In FIG. 5a, the example XML, is shown in a serial text document with elements embedded within tag sets (for example between <company> and </company>. In FIG. 5b the same example XML is represented in a formatted document showing white space and indentations. For the sake of illustrating how a single direction tree work, the example is used where a client application needs to process a simple XML document to extract employee names for department that have a prime number in their name.

Since the client application is interested in the child-parent relationships between the XML elements, it can use an event based processing method and analyze the events to deduce the relationships or it can use a tree based processing method. In this simple scenario, it may be easy enough to deduce the relationships between the elements however in more complex scenarios, it can be hard to do so. For the sake of illustration, it is assumed that the client application decides to utilize a tree based processing method.

Figure 6:
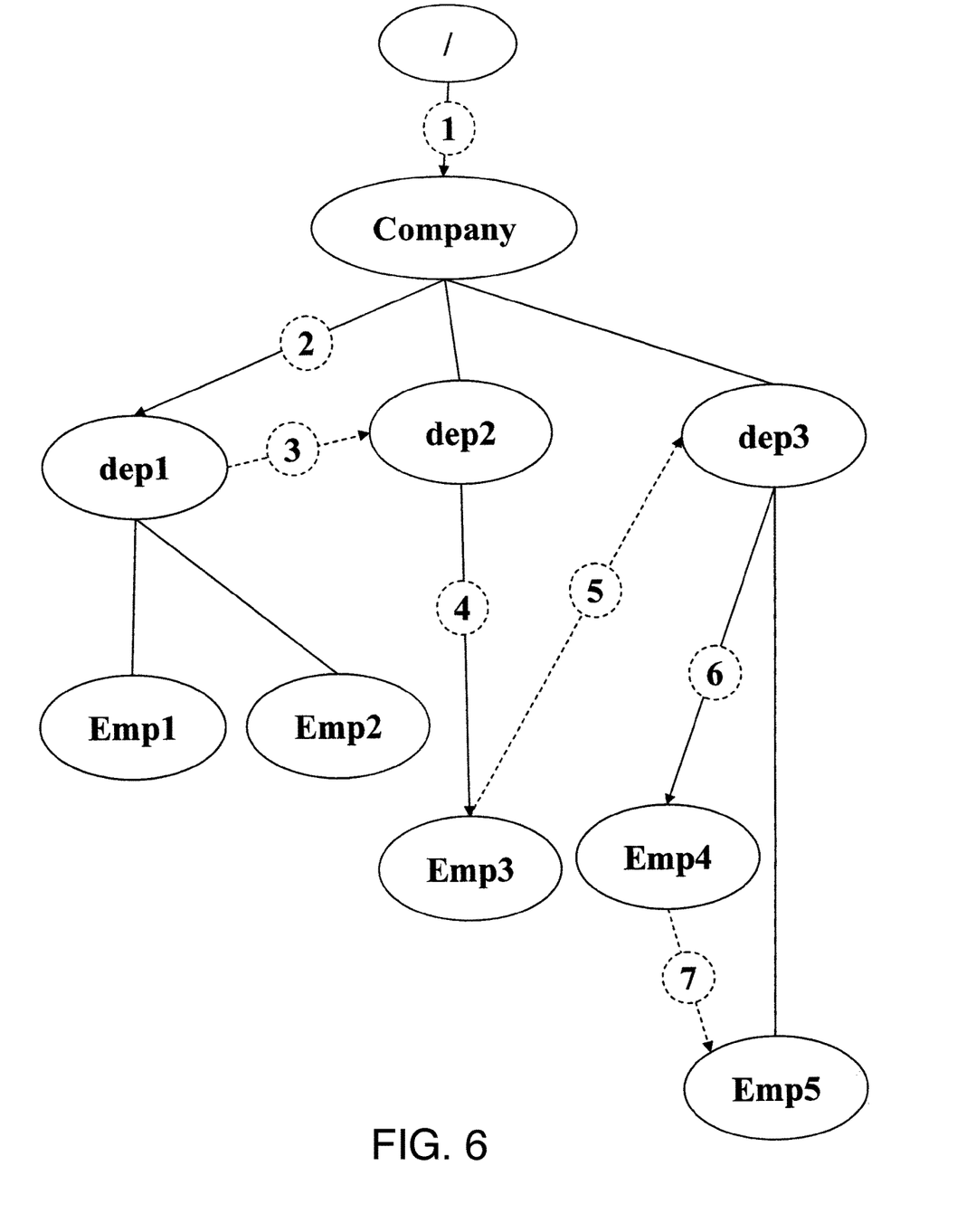
FIG. 6 is an example tree structure showing the parsing steps of the preferred embodiment, and FIG. 7 provides a high-level flowchart of one or more steps performed by one or more processors to parse data elements arranged in a structured tree within a document in accordance with one or more embodiments of the present invention.

Referring to FIG. 6, a tree representation is shown of the example XML document of FIG. 5a and FIG. 5b as loaded into memory. This example is limited to ten elements whereas a typical DOM tree would have many more. The client application is only interested in three elements: Emp3, Emp4, and Emp5. In a typical DOM processing method, after the tree is loaded, the client application will iterate through the tree in the direction shown by the numbered arrows.

The iteration order depicted in FIG. 6 is a single direction because once the parsing module has moved forward in the document (that is left to right in the example in FIG. 5a and downwards in FIG. 5b) it cannot go backward again. Moving forward means that the client application and parsing module iterate to the right hand element (as seen from FIG. 6) or to a child element. An example sequence of iterator calls that moving forward through the document comprises: 1) next child from the root to the Company element; 2) next child from the company element to dep1; 3) next sibling from dep1 to dep2 (reading but ignoring Emp1 and Emp2); 4) next child from dep2 to Emp3; 5) next sibling from Emp3 to dep3; 6) next child from dep3 to Emp4; and 7) next sibling from Emp4 to Emp5. A single direction tree allows only a single direction of iteration. In some scenarios, a parsing module client application can perform one way iteration on a tree and during the iteration it can generate another tree using application specific objects that are more convenient for client application processing. The output tree may or may not be a single direction tree.

Example calls are described below in a structure list numbered 1.1 to 7.1 corresponding to the numbered jumps 1 to 7 in FIG. 6. The calls are from a client application and to the parser.

1.1 rootNode=parser.getRootNode("company.xml"). Remark: this instruction call sets a variable 'rootNode' equal to whatever root element is discovered by method parser.getRootNode( ) acting on the document 'company.xml'

1.2 itr0=rootNode.getIterator( ). Remark: this instruction call sets variable itr( ) to equal the result of getting a new iterator (getIterator( )) from the root element variable rootNode.

1.3 companyNode=itr0.next( ). Remark: this instruction call sets variable companyNode equal to the result of getting the next sibling (next( ) from the variable itr0, in the example this is "Company".

2.1 itr1=companyNode.getIterator( ). Remark: this instruction call sets variable itr1 equal to new iterator object from the variable companyNode.

2.2 dep1=itr1.next( ). Remark: this instruction sets variable dep1 as the next sibling from the iterator itr1, in this example this is the value "dep1".

3.1 dep2=itr1.next( ). Remark: this instruction call sets variable dep2 as the next sibling from the iterator itr1, in this example this is the value "dep2".

4.1 dep2Itr=dep2.getIterator. Remark: this instruction call sets variable dep2Itr equal to a new iterator object from the variable dep2.

4.2 emp3=dep2Itr.next( ). Remark: this instruction call sets variable emp3 as the next sibling from the iterator dep2Itr, in this example this is the value "Emp3".

5.1 dep3=itr1.next( ). Remark: this instruction call sets variable dep3 as the next sibling from the iterator itr1, in this example this is the value "dep3".

6.1 dep3Itr=dep3.getIterator( ). Remark: this instruction call sets variable dep3Itr equal to a new iterator object from the variable dep3.

6.2 emp4=dep3Itr.next( ). Remark: this instruction call sets variable emp4 as the next sibling from the iterator dep3Itr, in this example this is the value "Emp4".

7.1 emp5=dep3Itr.next( ). Remark: this instruction call sets variable emp5 as the next sibling from the iterator dep3Itr, in this example this is the value "Emp5".

A single direction tree within a document does not have references to element children since a child element is defined as such by virtue of its position in relation to the parent. In the preferred embodiment, the client application calls the iterator parser to iterate from a child element. The results that are sent back do not contain references to child elements but do have references to the parser module that reads the physical data. When the client application uses the iterator parser to iterate over children elements, the iterator reads the next element data and constructs a child element and returns this to the client application without maintaining a reference to it.

As presented herein, in one embodiment the present relates to a single direction parser and method for parsing an extended markup language (XML) document. The parser for parsing a plurality of data elements arranged in a structured tree within a document, wherein said elements are arranged with a root element at a root level branching to remaining elements at lower levels within branches of the structured tree, said parser comprising: an interface for receiving an external request to provide a next sibling element or a next child element in the structured tree, returning a provided requested element, and repeating the receiving of external requests for the elements until there are no more requests or no more next elements; a next sibling method for providing a next sibling element by fetching the next and subsequent elements in the document until the next element is a next element at a specified sibling level in the structured tree and returning the next sibling element; and a next child method for providing the next child element by fetching and returning the next element if the next element is a child element or else providing a null result.

Thus, as described herein, in a first aspect of the invention there is provided a parser for parsing a plurality of data elements arranged in a structured tree within a document, wherein said elements are arranged having a root element at a root level branching to remaining elements at lower levels within branches of the structured tree, said parser comprising: an interface for receiving an external request to provide a next sibling element or a next child element in the structured tree, returning a provided element, and repeating the receiving of external requests for elements until there are no more requests or no more elements; a next sibling method for providing a next sibling element by fetching the next and subsequent elements in the document until the next element is an next element at a specified sibling level in the structured tree and returning the next sibling element; and a next child method for providing the next child element by fetching and returning the next element if the next element is a child element or else providing a null result.

A standard approach is to define element levels as descending from the root element, such that a structured tree drawing has the root element at the top of the figure and the branched elements branching down to the bottom of the figure (as opposed to an organic tree where the branches grow up). For instance, a child element is at a lower level than its parent element and so on for subsequent child elements.

The embodiments make it possible not to load a document into memory and therefore to allow a device to process documents having a larger memory size than the available memory space on the device. No auxiliary storage is needed.

Since the embodiments allow for low parsing with low memory use there is no need, as with prior art parsers, to use a garbage collector. Therefore the embodiments can be implemented in more languages and run on more devices.

In a lot of scenarios, client applications need to read the XML data to process certain information from the XML data, convert some information to application specific objects for further processing, or transform this information to another structure or format. In these scenarios, if the client application does not need the structure relationships between the elements of the tree, an event based processing method is usually used. However, if the relationships are required, the client application usually uses tree based processing and sacrifices memory. The present solution recognizes that the tree elements are not always required after retrieval and a parser does not need to retain references for the elements. A client application can infer relationships if it needs to. With this finding in mind, a tree which can be deduced and can be used once and thrown away after iteration can be beneficial in such scenarios. This kind of tree is referred in this document as a single direction tree; it is a tree that client applications can iterate over in a single direction and once an element has been iterated over, the element is no longer referenced by the tree structure. Thus if the application client does not maintain a reference to this element, the element can be safely removed from memory and iteration over the tree can continue. This tree has a great advantage over previously described inventions because there is no need to maintain weak references between tree elements, store information in a databases, or implement an optimizers to analyze what operation the client application is processing. This tree also overcomes the memory issue that exists in normal DOM implementations while preserving the structural relationships between the elements.

The embodiments have a technical effect of reducing the processing bandwidth required by the client application carried on outside the parsing engine computer.

The embodiments have a technical effect that operate at the machine level of the computer and is transparent to the client application.

The embodiments also have a technical effect that results in a parsing engine not requiring a garbage collection so that the computer is made to operate in a new way.

Preferably the parser further comprises an iterator object having a specified sibling level created when a next child is requested if the next element is a child at a new sibling level and wherein the iterator object is provided to the external requestor for receiving a request from the external requestor for a next sibling and forwarding the request, together with the specified sibling level to the parser. In a preferred embodiment the request for a next child comes from an application (either directly to the parsing method or via another iterator) in the form of a request for a new iterator and then a subsequent request via the new iterator for the first sibling. It is also possible for the application to request a sibling at a particular sibling level directly from the parsing method and in this embodiment a child method is not essential however, the application has to track the value of sibling level itself whereas in the preferred embodiment the value of the sibling level is tracked by the iterator object. In a further embodiment the application simply requests a next sibling and the next sibling at the last used sibling level is returned.

More preferably subsequent external requests for a next sibling from an application are received via an already provided iterator object having a specified sibling level. Still more preferably the parser further providing a null result if a next sibling has been requested and there are no more sibling elements at the specified sibling level in the document.

Advantageously the parser provides a null result if a child element is requested and the next element is not a child element.

More advantageously the parser further comprises: a pointer for pointing at an element and initially pointing at the root element; a pointer level counter for counting the level of the pointed to element and initial set at the root level; and an updater for updating the pointer and the pointer level counter each time a next element is fetched.

Still more advantageously the parser provides a next sibling element at a specified sibling level comprises fetching a next element to the pointer element and corresponding next level of the next element and checking if the corresponding next level is the same as the specified sibling level whereby returning the next element or else repeating the fetching and checking until the checking condition is satisfied or until there are no more elements at the specified sibling level.

Suitably the pointer element level counter counts integer values. More suitably if the specified level is the root level and the next sibling is requested then recognizing that the root level is the highest level in the document and returning a null value.

In a second aspect of the invention there is provided a method for parsing a plurality of data elements arranged in a structured tree within a document, wherein said elements are arranged with a root element at a root level branching to remaining elements at lower levels within branches of the structured tree, said method comprising: receiving an external request to provide a next sibling element or a next child element in the structured tree; providing a next element by fetching the next and subsequent elements in the document until the next element is an next element at a specified sibling level in the structured tree and returning the next element; returning the requested element; and repeating the receiving of external requests for the elements until there are no more requests or no more next elements.

In a third aspect of the invention there is provided a computer program product for parsing a plurality of data elements arranged in a structured tree within a document, wherein said elements are arranged with a root element at a root level branching to remaining elements at lower levels within branches of the structured tree, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method comprising:

receiving, by one or more processors, a request from a client application for a first child data element and a second child data element from a structured tree, wherein the structured tree represents an extensible markup language (XML) document;

traversing, by one or more processors, through the structured tree using a single direction iteration order until the first child data element is reached incrementing, by one or more processors, an element level counter to describe a level of the structured tree at which a first sibling data element is located;

determining, by one or more processors, that the first child data element is a leaf node having no further child nodes in the structured tree;

in response to determining that the first child data element is a leaf node in the structured tree, redefining, by one or more processors, the first child data element as a sibling to the first sibling data element;

in response to the first child data element being redefined as the sibling to the first sibling data element, traversing, by one or more processors, from the first child data element through a second sibling data element in order to reach the second child data element;

in response to traversing from the first child data element through the second sibling data element in order to reach the second child data element, removing, by an iterator parser, references in memory to the second sibling data element;

in response to reaching the second child data element, removing, by one or more processors, from memory any description of the structured tree that was used to reach the first child data element and the second child data element other than the element level counter that describes the level of the structured tree at which the first sibling data element and the second sibling data element are located, wherein the description of the structured tree that was used to reach the first child data element and the second child data element other than the element level counter that describes the level of the structured tree at which the first sibling data element and the second sibling data element are located is used once and discarded after locating and returning the first child data element and the second child data element;

subsequent to removing from memory said any description of the structured tree that was used to reach the first child data element and the second child data element other than the element level counter that describes the level of the structured tree at which the first sibling data element and the second sibling data element are located, receiving, by one or more processors, a request from the client application for a third child data element from the structured tree, wherein the third child data element is a child of the second sibling data element;

utilizing, by one or more processors, a content of the element level counter to reconstruct the structured tree from the second sibling data element to the third child data element; and locating and returning, by one or more processors, the third child data element in the reconstructed structured tree to the client application.

2. The method of claim 1, further comprising:

determining, by one or more processors, that there are no more child data elements in the reconstructed structured tree; and in response to determining that there are no more child data elements in the reconstructed structured tree, returning, by one or more processors, a null result to the requester.

3. The method of claim 1, wherein the one or more processors locate the third child data element by traversing from the first sibling data element to the first child data element to the second sibling data element to the second child data element to the third child data element, and wherein the first child data element has been redefined as a sibling of the first sibling data element and the second sibling data element.

4. The method of claim 1, wherein subsequent external requests for a next sibling data element from an application are received via an iterator object having a specified sibling level.

5. The method of claim 1, further comprising:

determining, by one or more processors, that a next sibling data element has been requested and that there are no more sibling data elements beyond the first sibling data element at a specified sibling level in the reconstructed structured tree; and providing, by one or more processors, a null result if the next sibling data element has been requested and there are no more sibling data elements beyond the first sibling data element and the second sibling data element at the specified sibling level in the reconstructed structured tree.

6. The method of claim 1, further comprising:

creating, by one or more processors, an iterator object having a specified sibling level, said iterator object being created in response to a next child data element being requested and in response to a next data element in the reconstructed structured tree being a child data element at a new sibling level, and wherein the iterator object is responsive to a request from the external requestor for a next sibling data element; and forwarding the request, together with the specified sibling level, to a parser of the document.

7. The method of claim 1, further comprising:

determining, by one or more processors, that a next requested data element beyond the first child data element, the second child data element, and the third child data element is not a child data element; and providing, by one or more processors, a null result if the next requested data element in the reconstructed structured tree is not a child data element.

8. The method of claim 1, further comprising:

providing, by one or more processors, another sibling data element that is pointed to by a next child data element; and returning, by one or more processors, said another sibling data element to the requester.

9. The method of claim 1, wherein the element level counter counts integer values.

10. The method of claim 1, wherein providing a sibling data element at a specified sibling level comprises:

fetching, by one or more processors, a first next data element to which a pointer element is pointing, wherein the first next data element is from a first level of the reconstructed structured tree;

fetching, by one or more processors, a second next data element from a second level of the reconstructed structured tree;

comparing, by one or more processors, the first level to the second level; and in response to determining that the first level and the second level are a same level of the reconstructed structured tree, identifying, by one or more processors, the first next data element and the second next data element as sibling data elements.

11. The method of claim 1, further comprising:

in response to a specified sibling level being the root level and a sibling data element being requested, recognizing, by one or more processors, that the root level is a highest level in the reconstructed structured tree and returning a null value.

12. A computer program product for returning a third child data element from a structured tree, the computer program product comprising a computer readable medium having program code embodied therewith, the program code readable and executable by a processor to perform a method comprising:

traversing through a structured tree using a single direction iteration order until a first child data element is reached, wherein the structured tree represents a document;

incrementing an element level counter to describe a level of the structured tree at which a first sibling data element is located;

determining that the first child data element is a leaf node having no further child nodes in the structured tree;

in response to determining that the first child data element is a leaf node in the structured tree, redefining the first child data element as a sibling to the first sibling data element;

in response to the first child data element being redefined as the sibling to the first sibling data element, traversing from the first child data element through a second sibling data element in order to reach a second child data element;

in response to reaching the second child data element, removing from memory any description of the structured tree that was used to reach the first child data element and the second child data element other than the element level counter that describes the level of the structured tree at which the first sibling data element and the second sibling data element are located, wherein the structured tree is used once and discarded after locating and returning the first child data element and the second child data element;

subsequent to removing from memory said any references to the structured tree that was used to reach the first child data element and the second child data element other than the element level counter, receiving a request from a requester for the third child data element from the structured tree, wherein the third child data element is a child of the second sibling data element;

utilizing a content of the element level counter to reconstruct the structured tree from the second sibling data element to the third child data element; and locating and returning the third child data element in the reconstructed structured tree to the requester.

13. The computer program product of claim 12, wherein the method further comprises:

determining that there are no more child data elements in the reconstructed structured tree beyond the first child data element, the second child data element, and the third child data element; and in response to determining that there are no more child data elements in the reconstructed structured tree beyond the first child data element, the second child data element, and the third child data element, returning a null result to the requester.

14. The computer program product of claim 12, wherein subsequent external requests for a next sibling data element from an application are received via an iterator object having a specified sibling level.

15. The computer program product of claim 12, wherein the method further comprises:

creating an iterator object having a specified sibling level, said iterator object being created in response to a next child data element being requested and in response to a next data element in the reconstructed structured tree being a child data element at a new sibling level, and wherein the iterator object is responsive to a request from the external requestor for a next sibling data element; and forwarding the request, together with the specified sibling level, to a parser of the document.

16. A computer system for returning a third child data element from a structured tree, wherein said computer system comprises:

a processor, a computer readable memory, and a computer readable storage medium;

first program instructions to traverse through a structured tree using a single direction iteration order until a first child data element is reached, wherein the structured tree represents a document;

second program instructions to increment an element level counter to describe a level of the structured tree at which a first sibling data element is located;

third program instructions to determine that the first child data element is a leaf node having no further child nodes in the structured tree;

fourth program instructions to, in response to determining that the first child data element is a leaf node in the structured tree, redefine the first child data element as a sibling to the first sibling data element;

fifth program instructions to, in response to the first child data element being redefined as the sibling to the first sibling data element, traverse from the first child data element through a second sibling data element in order to reach a second child data element;

sixth program instructions to, in response to reaching the second child data element, remove from memory any description of the structured tree that was used to reach the first child data element and the second child data element other than the element level counter that describes the level of the structured tree at which the first sibling data element and the second sibling data element are located, wherein the structured tree is used once and discarded after locating and returning the first child data element and the second child data element;

seventh program instructions to, subsequent to removing from memory said any references to the structured tree that was used to reach the first child data element and the second child data element other than the element level counter, receive a request from a requester for the third child data element from the structured tree, wherein the third child data element is a child of the second sibling data element;

eighth program instructions to utilize a content of the element level counter to reconstruct the structured tree from the second sibling data element to the third child data element; and ninth program instructions to locate and return the third child data element in the reconstructed structured tree to the requester; and wherein said first, second, third, fourth, fifth, sixth, seventh, eighth, and ninth program instructions are stored on said computer readable storage medium, and wherein said program instructions are executed by said processor via said computer readable memory.

17. The computer system of claim 16, further comprising:

tenth program instructions to determine that there are no more child data elements in the reconstructed structured tree; and eleventh program instructions to, in response to determining that there are no more child data elements in the reconstructed structured tree, return a null result to the requester; and wherein said tenth and eleventh program instructions are stored on said computer readable storage medium, and wherein said program instructions are executed by said processor via said computer readable memory.

18. The computer system of claim 16, wherein subsequent external requests for a next sibling data element from an application are received via an iterator object having a specified sibling level.

19. The computer system of claim 16, further comprising:

tenth program instructions to determine that a next sibling data element has been requested and that there are no more sibling data elements beyond the first sibling data element at a specified sibling level in the reconstructed structured tree; and eleventh program instructions to provide a null result if the next sibling data element has been requested and there are no more sibling data elements beyond the first sibling data element and the second sibling data element at the specified sibling level in the reconstructed structured tree; and wherein said tenth and eleventh program instructions are stored on said computer readable storage medium, and wherein said program instructions are executed by said processor via said computer readable memory.

20. The computer system of claim 16, further comprising:

tenth program instructions to create an iterator object having a specified sibling level, said iterator object being created in response to a next child data element being requested and in response to a next data element in the reconstructed structured tree being a child data element at a new sibling level, and wherein the iterator object is responsive to a request from the external requestor for a next sibling data element; and eleventh program instructions to forward the request, together with the specified sibling level, to a parser of the document; and wherein said tenth and eleventh program instructions are stored on said computer readable storage medium, and wherein said program instructions are executed by said processor via said computer readable memory.

\* \* \* \* \*